United States Patent
Lee et al.

(10) Patent No.: US 12,038,367 B2
(45) Date of Patent: Jul. 16, 2024

(54) METHOD FOR MEASURING CONDENSABLE PARTICULATE MATTERS FORMED FROM EXHAUST GAS

(71) Applicant: KOREA INSTITUTE OF SCIENCE AND TECHNOLOGY, Seoul (KR)

(72) Inventors: Seung Bok Lee, Seoul (KR); Changhyuk Kim, Busan (KR); Kyungil Cho, Busan (KR); Giwon Kang, Busan (KR); Nam Geon Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 75 days.

(21) Appl. No.: 17/856,246

(22) Filed: Jul. 1, 2022

(65) Prior Publication Data
US 2023/0003629 A1    Jan. 5, 2023

(30) Foreign Application Priority Data
Jul. 5, 2021 (KR) .................. 10-2021-0087742

(51) Int. Cl.
*G01N 15/02* (2024.01)
*G01N 1/24* (2006.01)
*G01N 1/34* (2006.01)

(52) U.S. Cl.
CPC ........... *G01N 15/0255* (2013.01); *G01N 1/24* (2013.01); *G01N 1/34* (2013.01); *G01N 2015/0261* (2013.01)

(58) Field of Classification Search
CPC ........ G01N 15/0255; G01N 1/24; G01N 1/34; G01N 2015/0261; G01N 15/02;
(Continued)

(56) References Cited

U.S. PATENT DOCUMENTS 11,105,726 B2    8/2021 Chang et al.
2007/0055438 A1* 3/2007 Twigg ................ G01N 33/0013
                                                       204/424
(Continued)

FOREIGN PATENT DOCUMENTS

CN    110441099 A    11/2019
JP    S63298133 A  * 12/1988
(Continued)

OTHER PUBLICATIONS

Ntziachristos, L., Amanatidis, S., Samaras, Z., Giechaskiel, B. et al., "Use of a Catalytic Stripper as an Alternative to the Original PMP Measurement Protocol," SAE Int. J. Fuels Lubr. 6(2):2013, doi: 10.4271/2013-01-1563. (Year: 2013).*
(Continued)

*Primary Examiner* — Marrit Eyassu
(74) *Attorney, Agent, or Firm* — NSIP Law

(57) ABSTRACT

The present invention relates to a method for measuring condensable particulate matters formed from exhaust gas of an internal combustion engine, including the steps of sucking exhaust gas from the internal combustion engine; diluting the sucked exhaust gas to simulate it to atmospheric condition; a first measurement step of branching some of the exhaust gas of the atmospheric condition and measuring particulate matters including condensable particulate matters and filterable particulate matters; a second measurement step of branching the rest of the exhaust gas of the atmospheric condition to remove the condensable particulate matters and measuring the particulate matters including only the filterable particulate matters; and comparing the first measurement step and the second measurement step to calculate an amount of the condensable particulate matters in the exhaust gas of the atmospheric condition.

6 Claims, 12 Drawing Sheets

(58) Field of Classification Search
CPC .. G01N 15/0205; G01N 1/2214; G01N 15/06;
G01N 1/2211; G01N 15/0266; G01N
2001/2255; G01N 2015/0046; G01N
1/2252; G01N 2001/2282; G01N
2015/0092; G01N 2015/0096
USPC ....................................................... 73/28.05
See application file for complete search history.

(56) References Cited

U.S. PATENT DOCUMENTS

2010/0050790 A1    3/2010  Akiyama et al.
2019/0219493 A1*   7/2019  Chang ................ G01N 15/0266

FOREIGN PATENT DOCUMENTS

| JP | 8-178880 A | 7/1996 | |
|---|---|---|---|
| JP | 5226435 B2 | 7/2013 | |
| KR | 10-0637863 B1 | 10/2006 | |
| KR | 10-2165770 B1 | 10/2020 | |
| KR | 10-2179129 B1 | 11/2020 | |
| KR | 10-2185185 B1 | 12/2020 | |
| KR | 10-2199628 B1 | 1/2021 | |
| KR | 10-2021-0076868 A | 6/2021 | |
| WO | WO-2019225591 A1 * | 11/2019 | .......... G01M 15/102 |

OTHER PUBLICATIONS

DiselNet, Emission Test Cycles. "Worldwide Harmonized Light Vehicles Test Cycle (WLTC)." (2019).

\* cited by examiner

METHOD FOR MEASURING CONDENSABLE PARTICULATE MATTERS FORMED FROM EXHAUST GAS

CROSS REFERENCE TO RELATED APPLICATION

The present application claims priority to Korean Patent Application No. 10-2021-0087742, filed on July 5, the entire contents of which is incorporated herein for all purposes by this reference.

BACKGROUND OF THE INVENTION

Field of the Invention

The present invention relates to a method for measuring condensable particulate matters formed from exhaust gas, and more particularly, to a method for measuring an amount of condensable particulate matters by separately measuring condensable particulate matters and filterable particulate matters.

Description about National Research and Development Support

This study was supported by the technology development program respond to the climate change of Ministry of Science and ICT, Republic of Korea (Projects No. 1711116689) under the superintendence of National Research Foundation of Korea.

Description of the Related Art

Particulate Matter (PM) is one of the main factors for evaluating air quality and has a great impact on health and the environment, so it is regulated through a permissible emission standard for air pollution sources including stationary pollution sources such as power plants and mobile pollution sources such as internal combustion engines including vehicles.

In general, the permissible emission standard of particulate matters of air and the calculation of emission factor of particulate matters are based on the weight of the filterable particulate matters (FPM) collected in a filter paper.

As described above, the particulate matters emitted from pollution sources in the form of particulate is called primary particulate matters, and is distinguished from secondary particulate matters that forms from gaseous precursors by photochemical reactions in the atmosphere.

Primary particulate matters include not only filterable particulate matters, but also condensable particulate matters (CPM). The condensable particulate matters are particles that are condensed at a rapid rate following a rapid temperature change as soon as the exhaust gas including filterable particulate matters is emitted from stacks or tailpipes to the atmosphere.

Since formation of the condensable particulate matters is affected by the temperature and pressure of the atmosphere involved in condensation, it is difficult to accurately measure and calculate it, unlike the filterable particulate matters. In addition, the condensable particulate matters has recently gained interest as a contrast to the filterable particulate matters, and unlike the filterable particulate matters, there is no domestically and internationally allowable emission standard for CPM, and related measurement standard methods have not yet been sufficiently established.

As an example of a method for measuring the condensable particulate matter, as shown in FIG. 8, there are two types, an impinger method that calculates an amount of potential condensable particulate matters by inserting a sampling port inside the chimney of a stationary pollution sources to extract potential gaseous pollutants that are going to form the condensable particulate matters, and a dilution method that simulates the formation mechanism of the condensable particulate matters in the air.

In the case of the impinger method, the amount of condensable particulate matters is calculated assuming that all gaseous pollutants dissolved in the solution used to collect gaseous pollutants are converted to the condensable particulate matters. Therefore, there is a disadvantage of overestimating the amount of condensable particulate matters.

In addition, in the case of the dilution method developed to compensate for the impinger method, the first filter paper is used to remove the filterable particulate matters, and then the condensable particulate matters homogeneously formed by the dilution air is collected on the second filter paper at the downstream and calculated.

However, since only room temperature air is used for dilution and the filterable particulate matter is removed, there is a disadvantage that the condensable particulate matters heterogeneously formed through the process of condensing on the surface of filterable particulate matters are not considered.

In addition, the method of calculating the emission amount by measuring the condensable particulate matters eventually collected on the filter paper for a certain duration time, such as the filterable particulate matter, can be applied to stationary pollution sources with relatively stable air pollutant emission, but is not suitable for mobile pollution sources such as internal combustion engines, including vehicles, where the composition and emission of air pollutants might be changed due to variables such as changes in combustion conditions and atmospheric temperature of the internal combustion engines during acceleration/deceleration.

In other words, the amount of condensable particulate matters affected by changing the composition and amount of emitted air pollutants can also change. Therefore, the existing impinger and dilution methods are not suitable for measuring the condensable particulate matters emitted by vehicles with large time variability and calculating an emission factor.

Therefore, in order to overcome these problems, it is necessary to develop a system capable of measuring in real time the change in the amount of condensable particulate matters emitted from the internal combustion engine including a vehicle, which may appear in various atmospheric conditions.

Documents of Related Art (Patent Document 1) KR Patent Publication No. 10-2199628

SUMMARY OF THE INVENTION

Accordingly, the present invention proposes a system capable of measuring in real time a change in an amount of condensable particulate matters emitted from an internal combustion engine including a vehicle that can be formed under various atmospheric conditions.

In order to achieve the above object, the present invention may provide a method for measuring condensable particulate matter formed from exhaust gas of an internal combustion engine including the steps of: sucking exhaust gas from the internal combustion engine; diluting the sucked exhaust gas to simulate it to atmospheric condition; a first measurement step of branching some of the exhaust gas of the atmospheric condition and measuring particulate matter including condensable particulate matter and filterable particulate matter; a second measurement step of branching the rest of the exhaust gas of the atmospheric condition to remove the condensable particulate matter and measuring the particulate matter including only the filterable particulate matter; and comparing the first measurement step and the second measurement step to calculate an amount of the condensable particulate matter in the exhaust gas of the atmospheric condition.

In addition, the present invention may further include the step of filtering fine particulate matter from the exhaust gas, after the step of sucking exhaust gas from the internal combustion engine.

In addition, the step of filtering fine particulate matter of the present invention may be implemented using a cyclone.

In addition, the step of diluting the sucked exhaust gas to simulate it to atmospheric condition of the present invention may be performed by injecting air into the exhaust gas in a dilution chamber.

In addition, in the present invention, the exhaust gas may be transferred via a conduit, and the conduit may be wound with a heating tape so that it is able to be heated, so the conduit may maintain a temperature range of 200° C. to 300° C.

In addition, in the step of diluting the sucked exhaust gas to simulate it to atmospheric condition of the present invention, a ratio of the air to a volume of the exhaust gas may be made in a dilution ration of 1:9 to 1:29, and the step may be performed in a range of −10° C. to 50° C. through a cooler and a heater.

In addition, in the present invention, some of the exhaust gas in the atmospheric condition may be branched to a bypass pipe, and the first measurement step may be performed. The rest of the exhaust gas in the atmospheric condition may be branched to a thermodenuder and the second measurement step may be performed.

In addition, the thermodenuder of the present invention may be heated in a range of 25° C. to 300° C., and the condensable particulate matter may be removed by being adsorbed on a carbon cloth inside the thermodenuder.

In addition, the step of calculating an amount of the condensable particulate matter may include measuring number density size distribution of the particulate matter including the condensable particulate matter and the filterable particulate matter in the first measurement step, measuring the number density size distribution of the particulate matter including only the filterable particulate matter in the second measurement step, and subtracting the concentration particle size distribution of the second measurement step from the concentration particle size distribution of the first measurement step.

According to the present invention, it is possible to completely remove a condensable particulate matter component from the particulate matter emitted by a vehicle, so it is possible to calculate the contribution and emission factor of condensable particulate matter among the particulate matter emitted by a vehicle, which is difficult to be confirmed by the existing evaluation method.

In addition, the present invention can calculate the change in the amount of condensable particulate matter in a specific section during a vehicle evaluation cycle by measuring in real time the particle size distribution of the particulate matter emitted from the vehicle.

In addition, since the present invention can simulate an atmospheric temperature condition, it can overcome the limitations of the existing method for evaluating the emission factor of the particulate matter emitted from the vehicle which is performed at room temperature, measure the amount of condensable particulate matter that is changed in various atmospheric conditions and calculate the emission factor of the particulate matter that is close to reality by reflecting the measurement.

In addition, since in the present invention a change in the dilution ratio is allowed, it is possible to calculate the emission factor of the particulate matter that is close to the reality by reflecting the amount of condensable particulate matter due to a change in the degree of dilution of the particulate matter emitted from the vehicle according to the density of the vehicles.

DETAILED DESCRIPTION OF THE INVENTION

Figure 1:
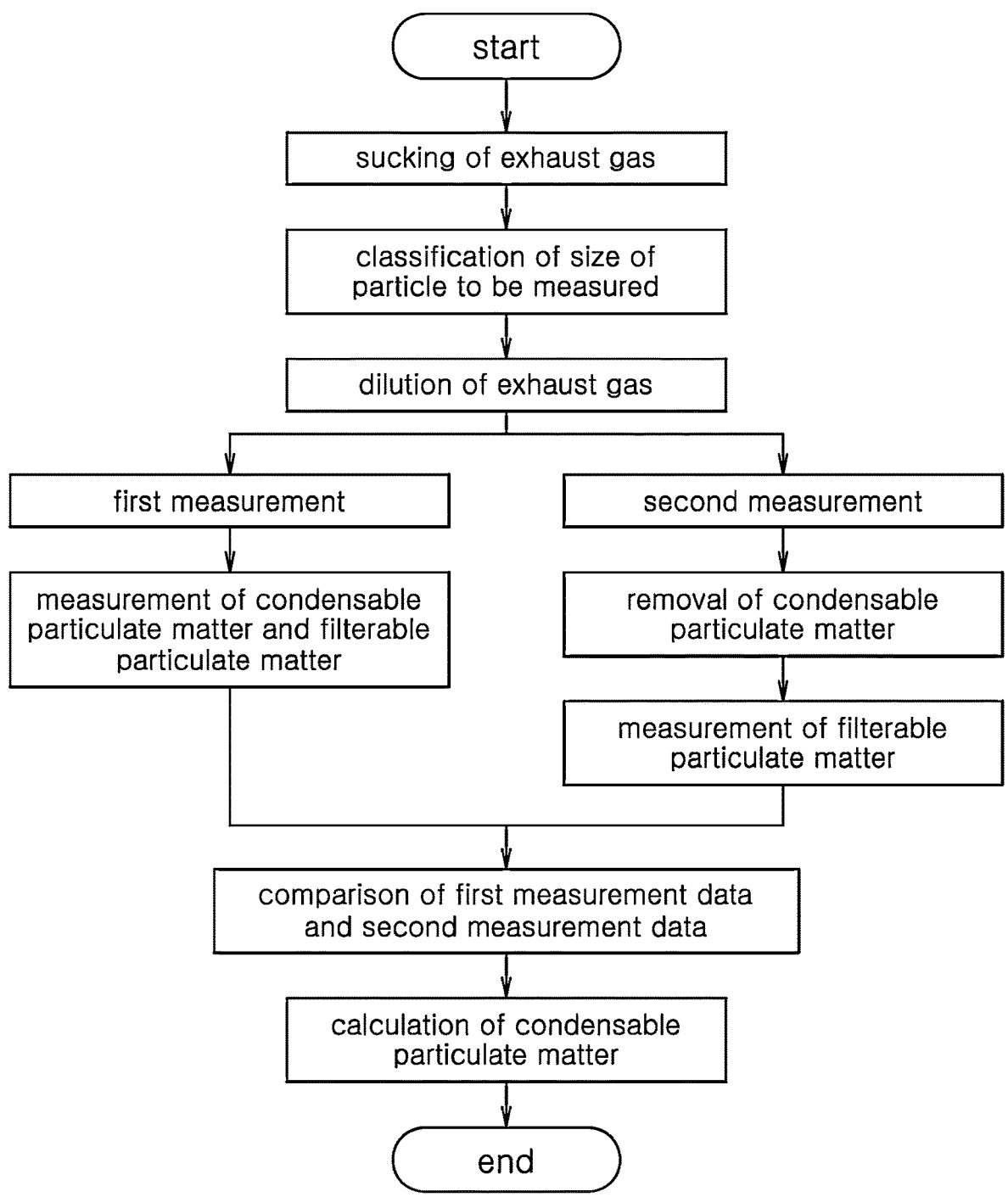
FIG. 1 is a flowchart showing a method for measuring condensable particulate matter according to an embodiment of the present invention.

Hereinafter, a method for measuring condensable particulate matter according to the present invention will be described through a preferred embodiment of the present invention based on the accompanying drawings.

Prior to the description, in various embodiments, the same reference numerals are used to represent components having the same configuration in one embodiment, and only other components will be described in other embodiments.

FIG. 1 is a flowchart showing a method of measuring condensable particulate matter according to an embodiment of the present invention.

As shown in FIG. 1, in a method for measuring particulate matter according to an embodiment of the present invention, some of exhaust gas may be sucked from an internal combustion engine, the particle size of fine particulate matter to be measured may be classified, the exhaust gas with the particle size classified may be diluted and simulated to atmospheric condition, and then, the data of a first measurement step of measuring particulate matter including condensable particulate matter and filterable particulate matter and the data of a second measurement step of measuring particulate matter including only the filterable particulate matter from which the condensable particulate matter is removed may be compared to each other to calculate an amount of condensable particulate matter in the exhaust gas.

Figure 2:
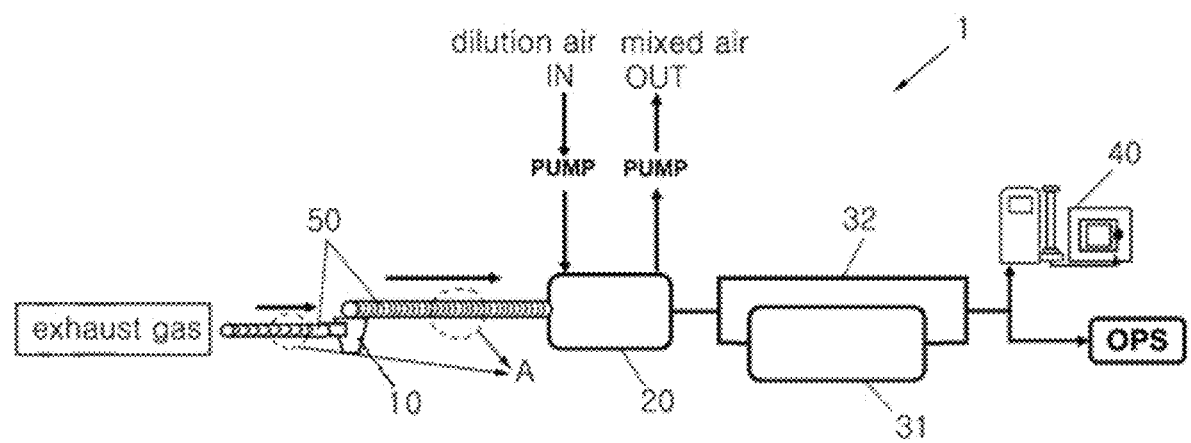
FIG. 2 schematically shows a system for measuring an amount of condensable particulate matter from exhaust gas emitted from a vehicle according to an embodiment of the present invention.
Figure 3:
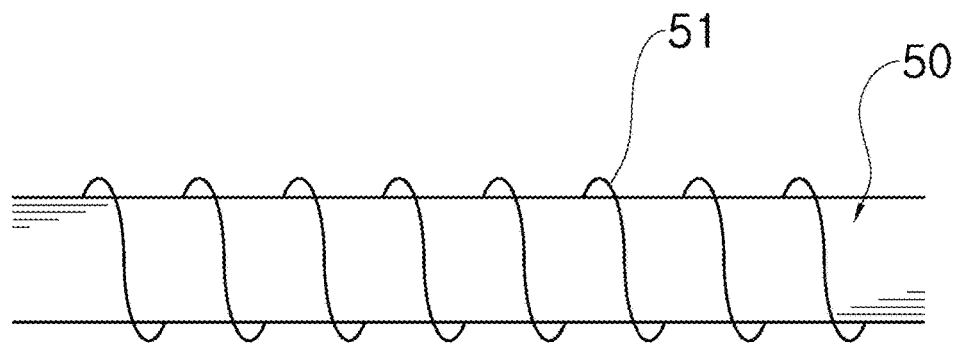
FIG. 3 is an enlarged view of part A of FIG. 2, schematically showing a system for maintaining a temperature of a conduit.

FIG. 2 schematically shows a system 1 for measuring an amount of condensable particulate matter from the exhaust gas emitted from a vehicle according to an embodiment of the present invention, and FIG. 3 schematically shows a system in which a temperature of a conduit 50 in part A of FIG. 2 is maintained.

As shown in FIG. 2, the system 1 for measuring condensable particulate matter according to an embodiment of the present invention is directly installed at the exhaust port of a vehicle to measure condensable particulate matter contained in exhaust gas.

Specifically, the sampling conduit 50 for sucking the exhaust gas of the vehicle is installed directly at the exhaust port of the vehicle. As shown in FIG. 3, since it is possible to heat the inside of the conduit by winding around the conduit with a heating tape 51, the temperature of the exhaust gas can be maintained in the range of 200° C. to 300° C.

Through this, the temperature of the sucked exhaust gas is maintained, so that it is possible to prevent unintended generation of condensable particulate matter 102 due to the occurrence of exhaust gas condensation in the conduit 50 or loss of the generation source of condensable particulate matter.

The particles larger than the fine particulate matter included in the sucked exhaust gas is preferentially removed by using a cyclone 10, and only the fine particulate matter can be passed therethrough. Specifically, in an embodiment of the present invention, a PM2.5 cyclone 10 is used, and through this, the matter larger than 2.5 μm can be preferentially filtered. Accordingly, unnecessary errors can be prevented by removing the particles having a particle size not considered in the exhaust gas of a vehicle.

Figure 4:
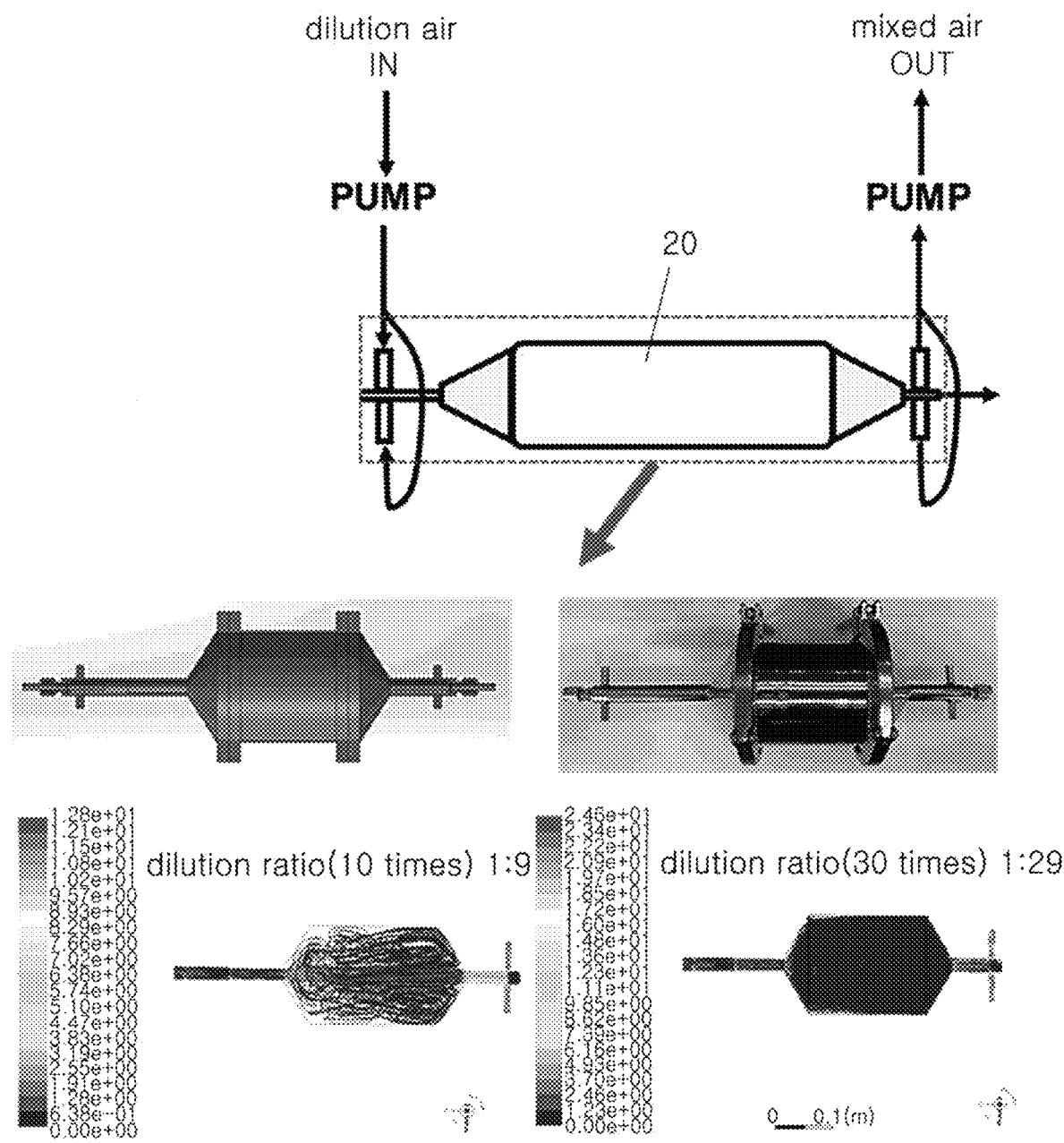
FIG. 4 schematically shows a system in which exhaust gas is diluted in a dilution chamber according to an embodiment of the present invention.

FIG. 4 schematically shows a system in which the exhaust gas is diluted in a dilution chamber 20 according to an embodiment of the present invention.

As shown in FIG. 4, a phenomenon in which the exhaust gas from which the fine particulate matter has been removed in the cyclone 10 is injected into a dilution chamber 20 and is diluted while being discharged to atmospheric conditions is simulated.

Specifically, the dilution chamber 20 can completely mix dilution air and the exhaust gas sample in a short time while controlling the temperature and a dilution ratio. The dilution ratio can be controlled by using a flow controller and a vacuum pump (not shown) to maintain a predetermined dilution ratio. In the dilution chamber 20, the dilution air is injected to generate turbulence, so that the exhaust gas sample can be mixed with the dilution air, and complete mixing can be performed in a short time.

The dilution ratio can be set to 2 to 50 times in a range that simulates the dilution ratio when the exhaust gas is exposed to the atmosphere, depending on the density of vehicles on a road, but preferably, the ratio of air to exhaust gas is 1:9 to 1:29. When the dilution ratio is greater than 1:9, it is difficult to obtain accurate data because the concentration of exhaust gas is set high and dilution is hardly performed, and when the dilution ratio is lower than 1:29, excessive dilution may occur.

On the other hand, the dilution chamber 20 can perform temperature control in the range of −10° C. to 50° C. Through this, by installing a cooler and a heater in the dilution chamber 20, it is possible to accurately simulate the atmospheric temperature according to the season, and it is possible to measure while changing the temperature conditions that contribute to the growth of condensable particulate matter.

Figure 5:
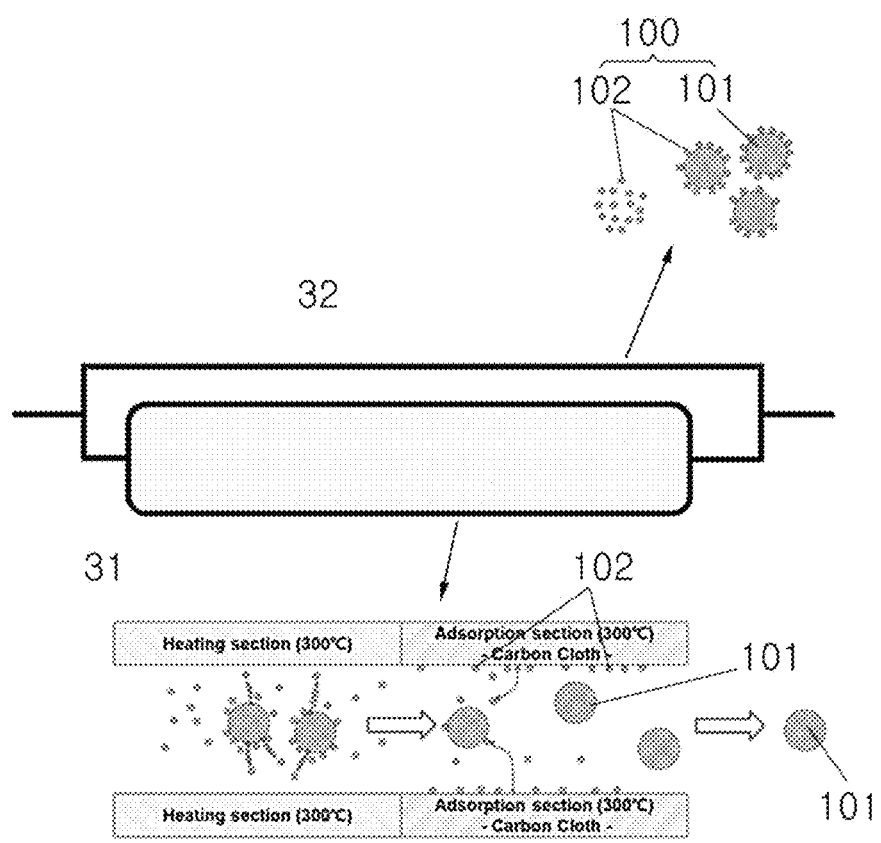
FIG. 5 schematically shows that condensable particulate matter is adsorbed in a thermodenuder according to an embodiment of the present invention.

FIG. 5 schematically shows that the condensable particulate matter is adsorbed and removed after volatilization in a gaseous phase in a thermodenuder 31 according to an embodiment of the present invention.

Specifically, some of the exhaust gas simulated to the atmospheric condition in the above-described dilution chamber 20 is branched to a bypass pipe 32. The exhaust gas particle 100 passing through the bypass pipe 32 contain both filterable particulate matter 101 and condensable particulate matter 102 as in the simulated atmospheric condition.

In addition, the remaining exhaust gas other than the exhaust gas branched to the bypass pipe 32 is branched to the thermodenuder 31. The condensable particulate matter 102 is volatilized by being heated to a range of 25° C. to 300° C. in the heating section inside the thermodenuder 31, and the volatilized condensable particulate matter 102 is absorbed on a carbon cloth of an adsorption section and then removed from the exhaust gas.

Figure 6:
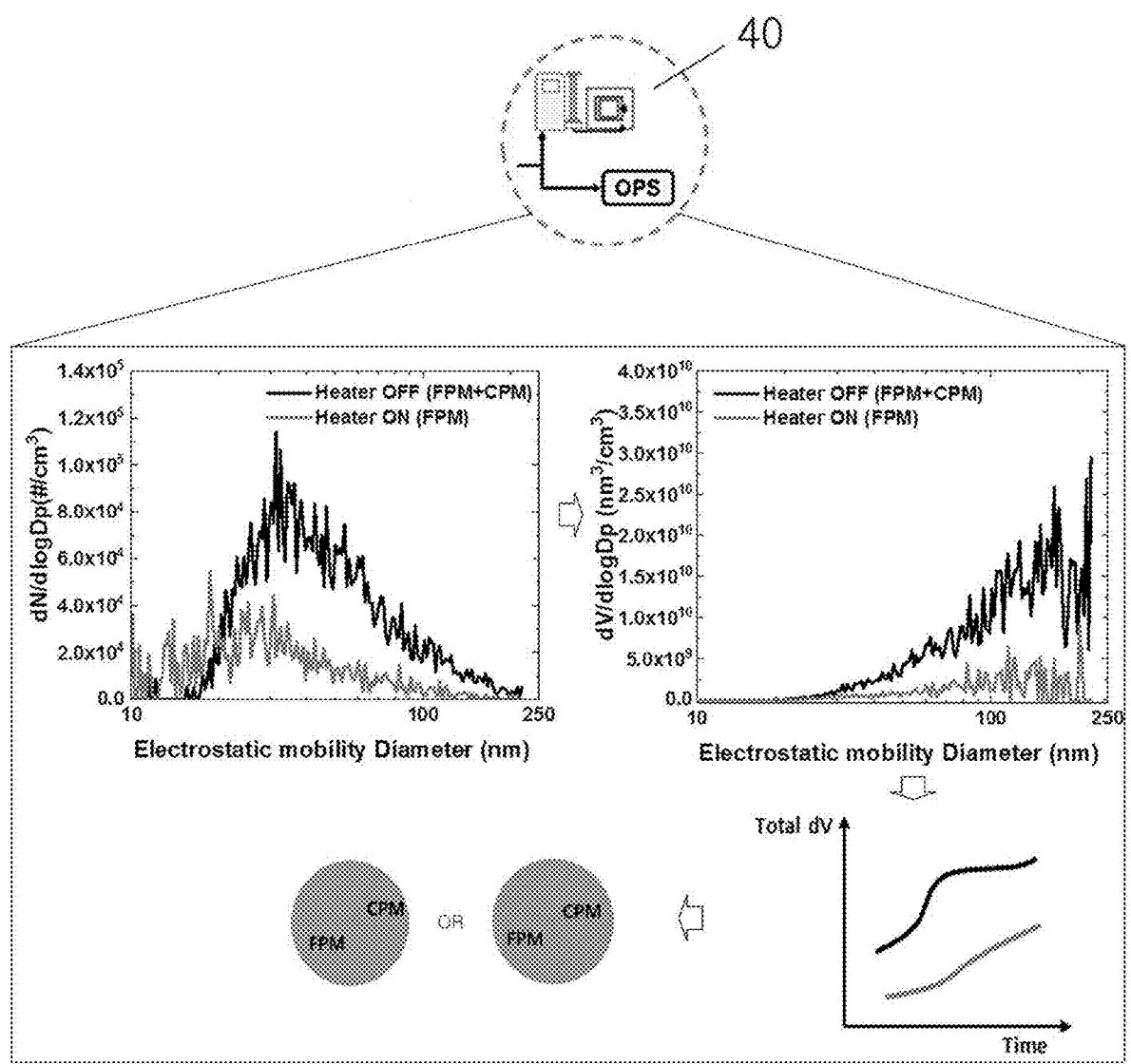
FIG. 6 schematically shows that condensable particulate matter is calculated by a calculator according to an embodiment of the present invention.
Figure 7A:
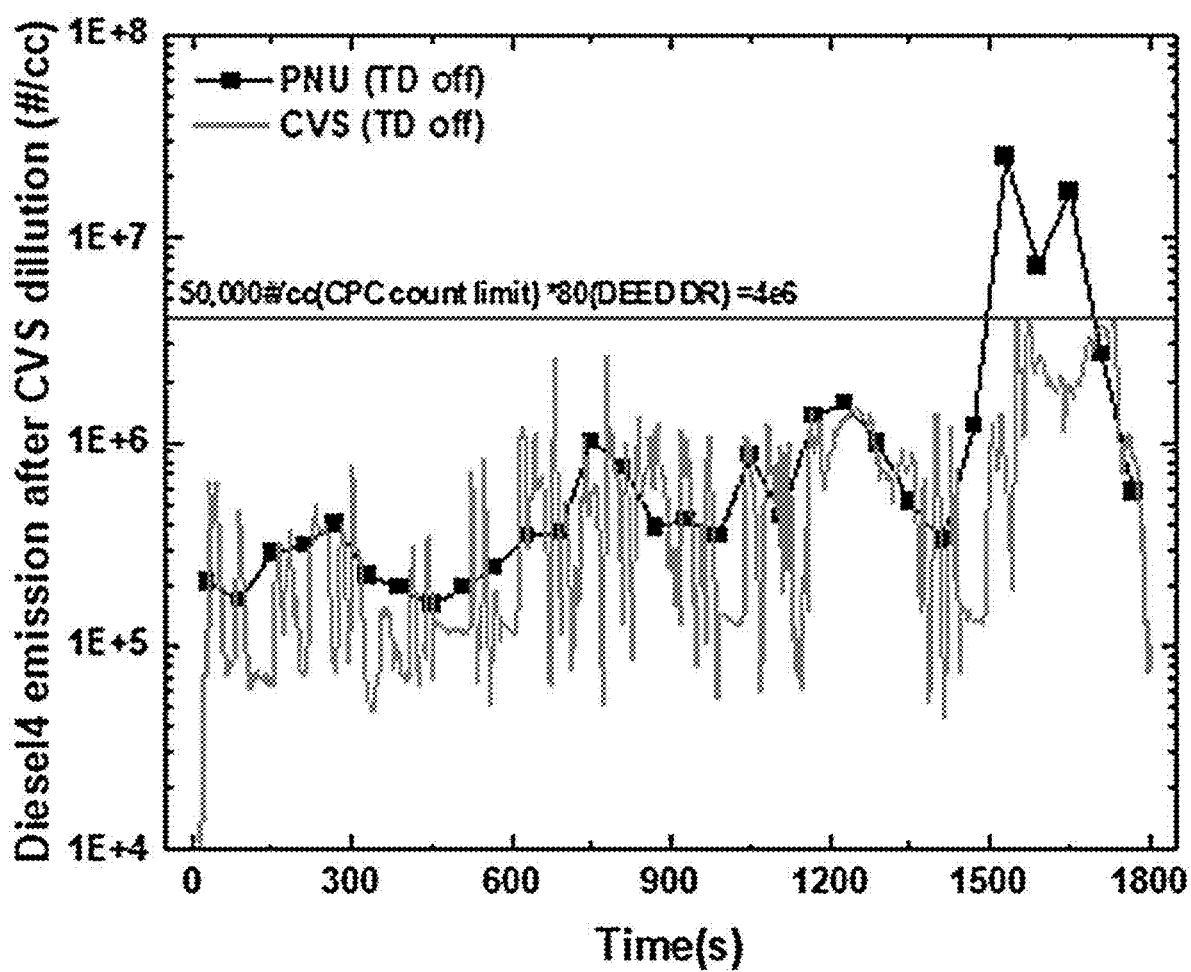
FIGS. 7A to 7F show graphs of measurement of condensable particulate matter according to an embodiment of the present invention.
Figure 7B:
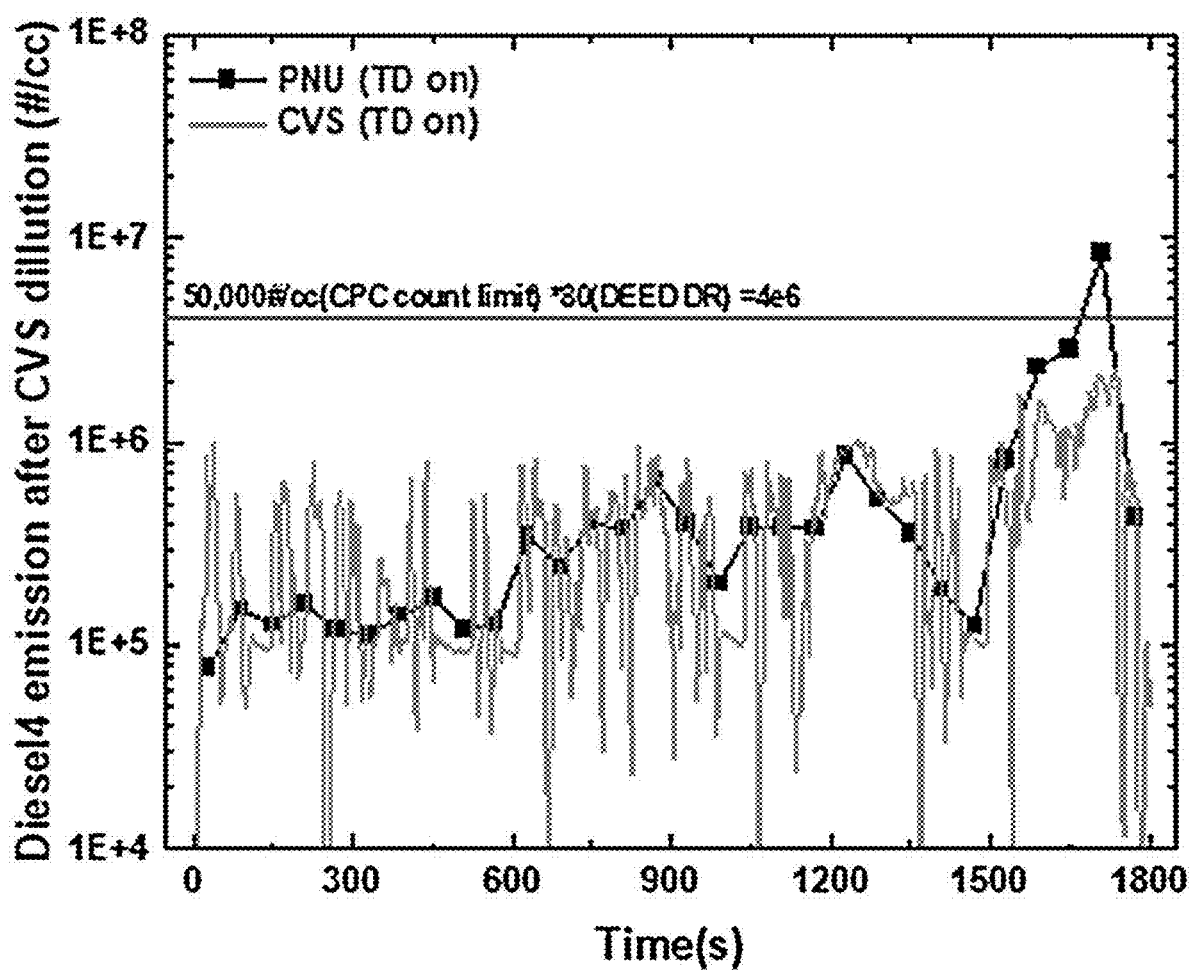
Figure 7C:
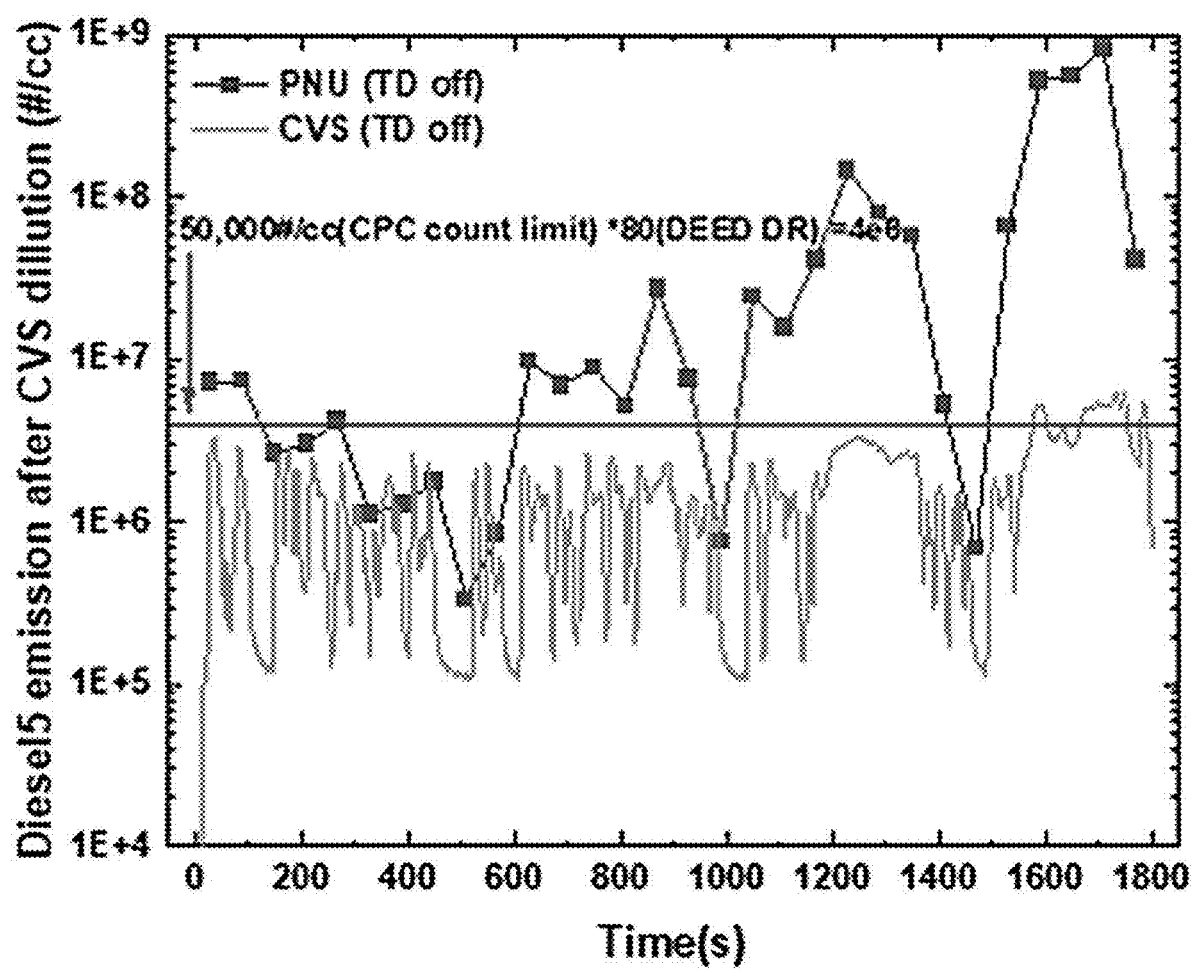
Figure 7D:
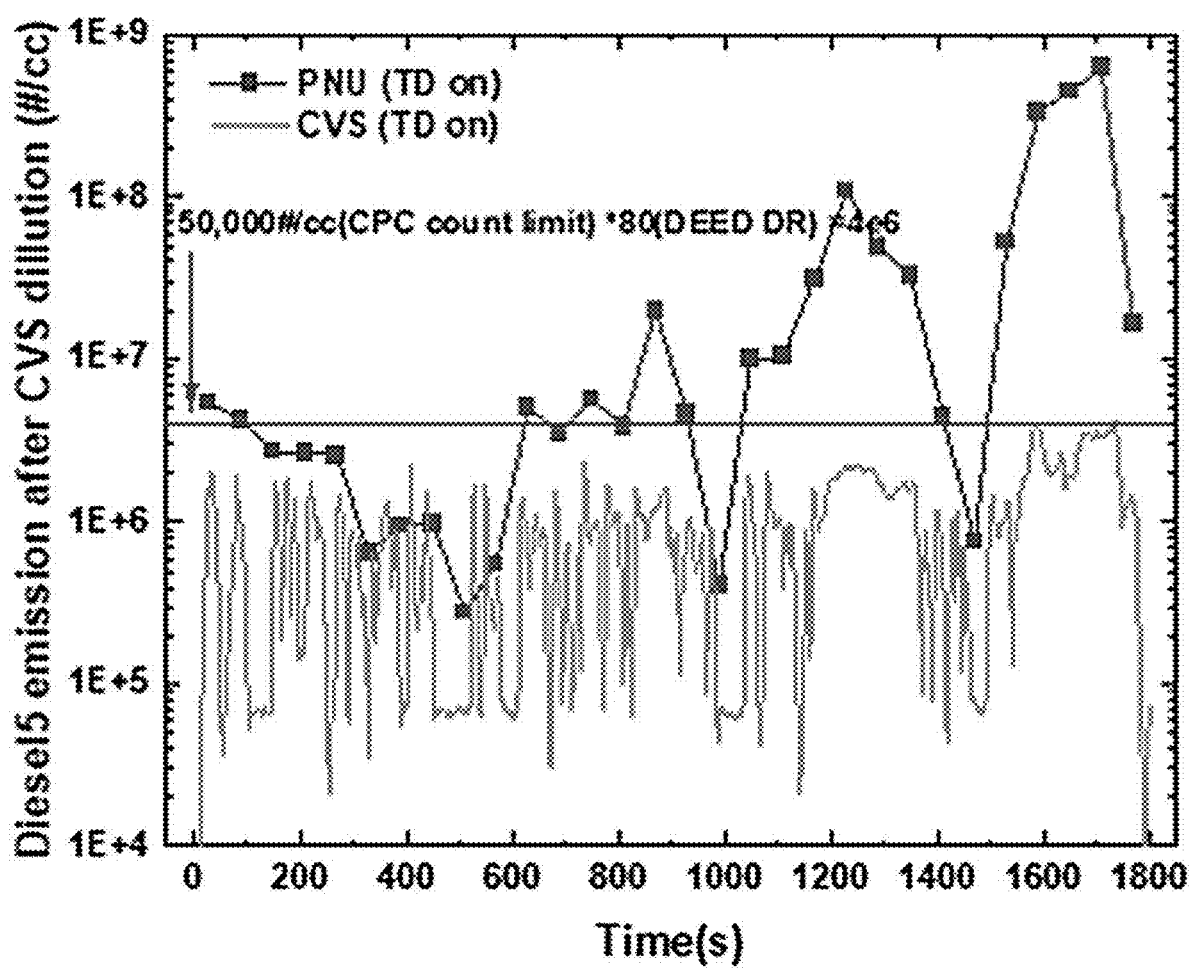
Figure 7E:
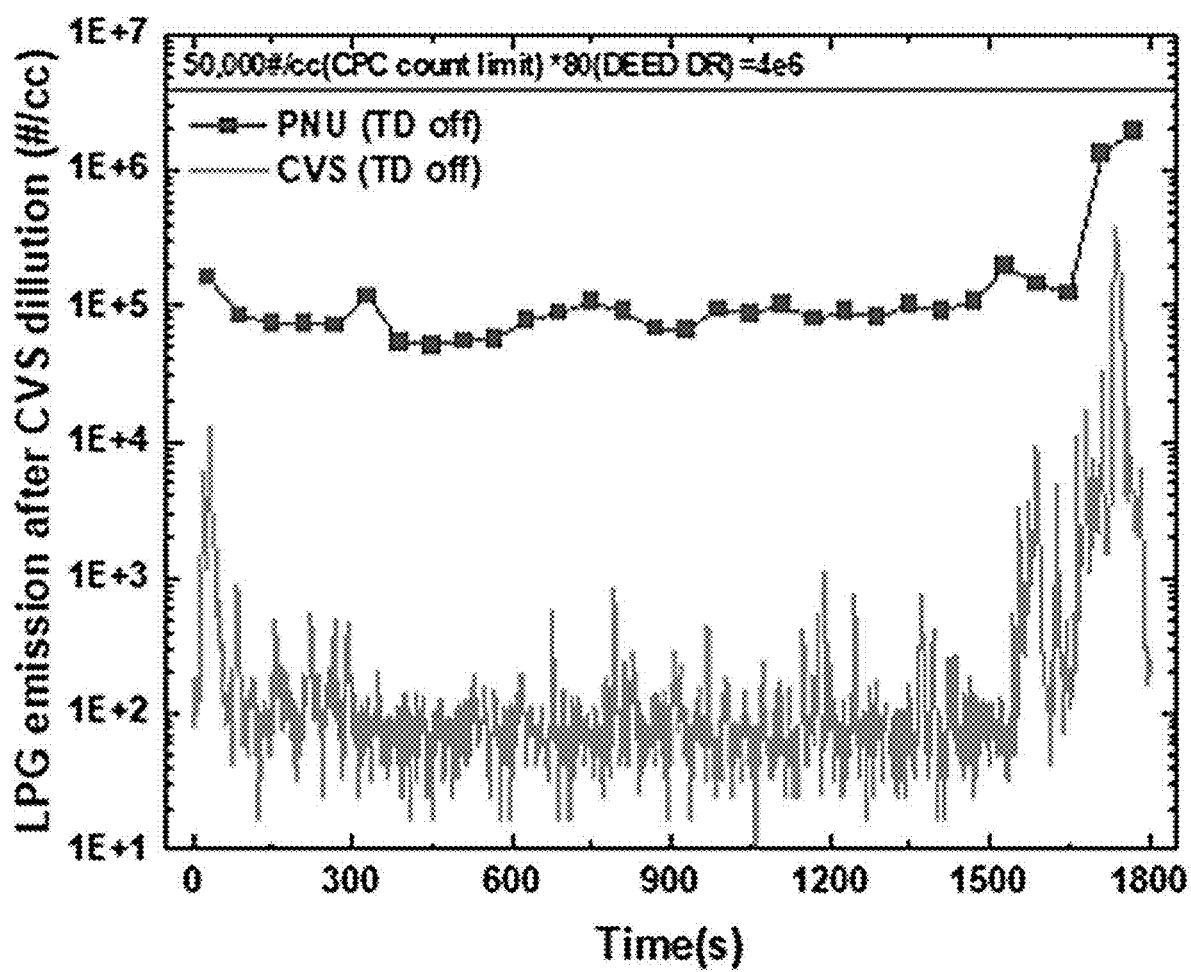
Figure 7F:
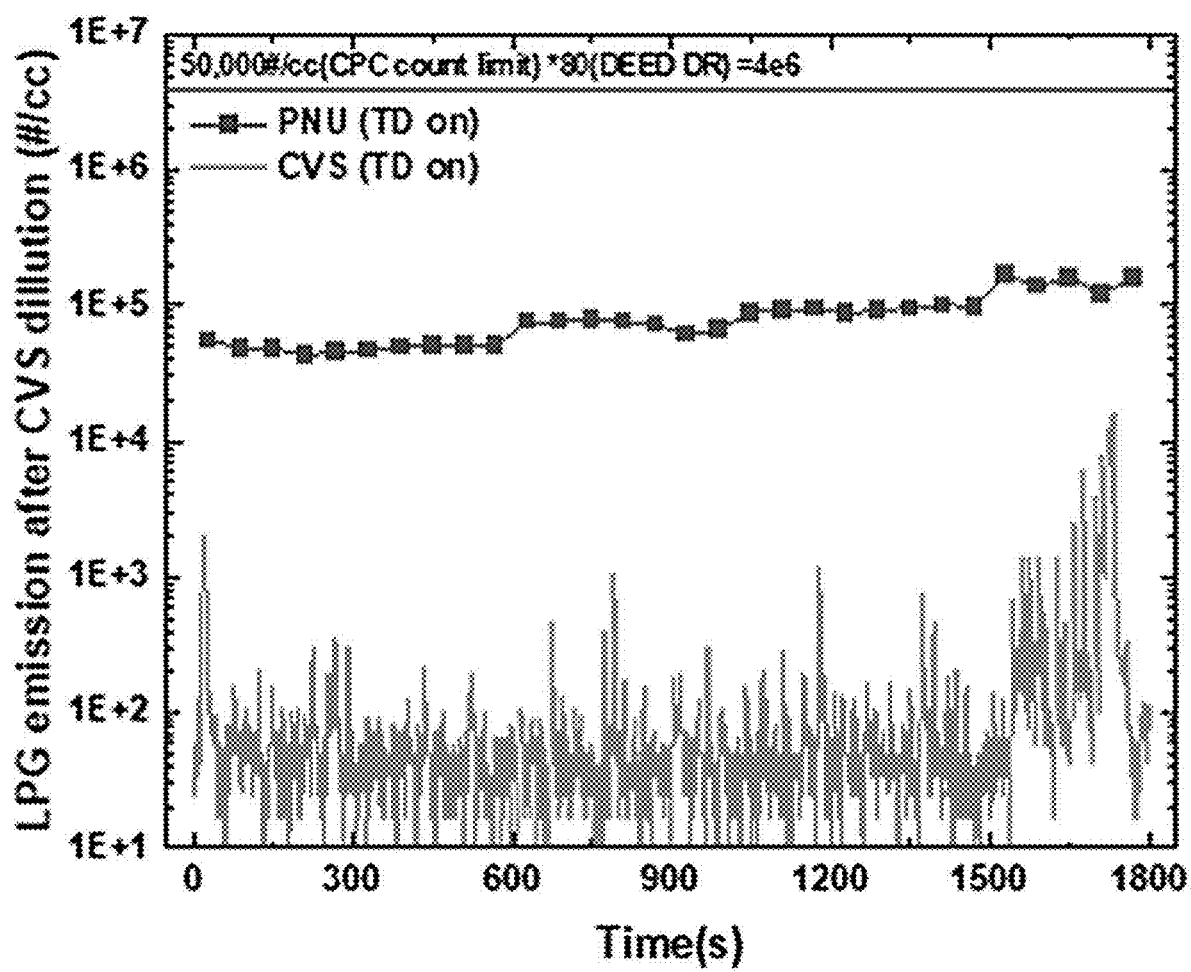
Figure 8:
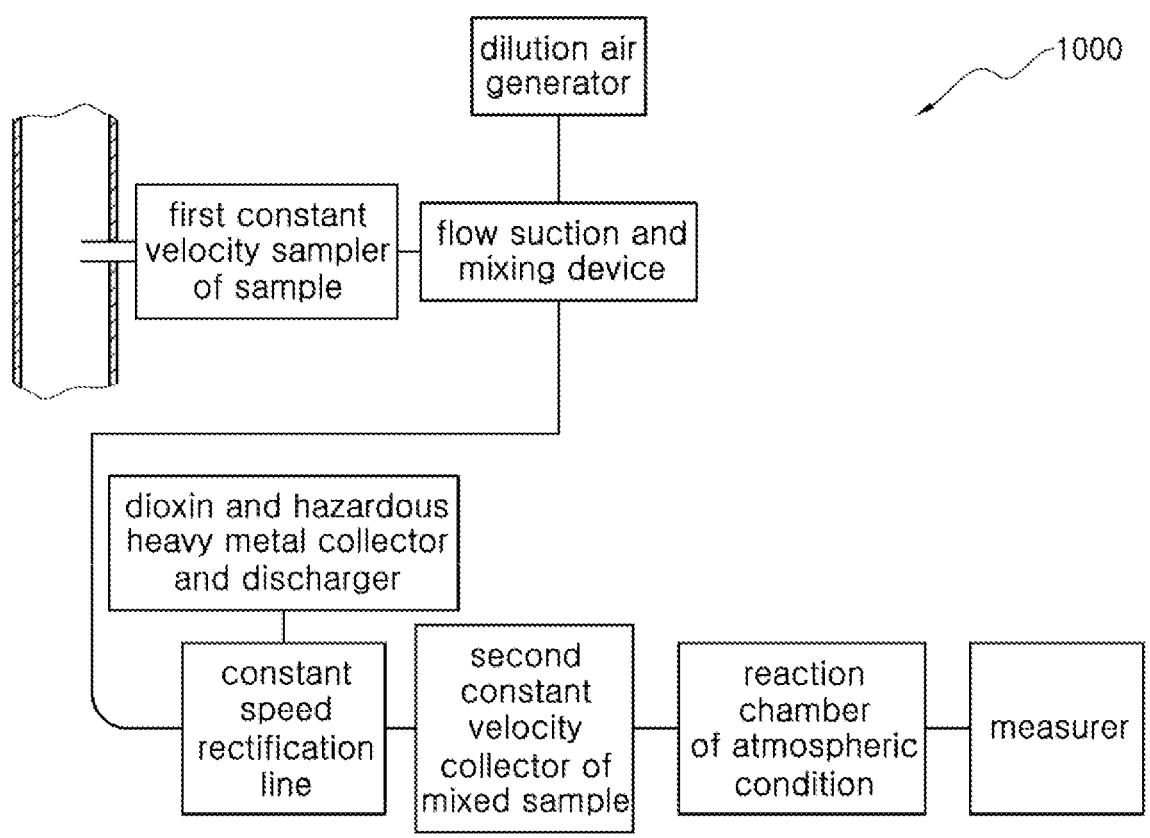
FIG. 8 schematically shows a system for measuring an amount of particulate matter emitted from a chimney according to the prior art.

FIG. 6 schematically shows that the condensable particulate matter is measured by a calculator 40 according to an embodiment of the present invention.

As described above, the exhaust gas particle 100 including both the condensable particulate matter 102 and the filterable particulate matter 101 in the bypass pipe 32 passes through the thermodenuder 31, and the exhaust gas from which the condensable particulate matter 102 is removed is compared to calculate the proportion of the condensable particulate matter 102.

As another embodiment of the present invention, it is also possible to measure the condensable particulate matter 102 formed when the exhaust gas is discharged to room temperature condition using only the thermodenuder 31. For example, when the temperature of the thermodenuder 31 is set to 25° C., since the condensable particulate matter 102 is not removed, it can be assumed that this is in the same conditions as the exhaust gas that has passed through the bypass pipe 32 in the above-described embodiment. Accordingly, the amount of condensable particulate matter 102 in the exhaust gas can be measured by comparing the data measured at 25° C. with the data measured by setting the thermodenuder 31 to 300° C.

On the other hand, as a device usable for number density size distribution measuring unit, for example, a scanning mobility particle sizer (SMPS), a fast mobility particle sizer (FMPS), or an optical particle sizer (OPS) may be used. With this device, it is possible to measure from a minimum of 3 nm to a maximum of 10 μm.

FIGS. 7A to 7F show the graphs of measurement of condensable particulate matter according to an embodiment of the present invention.

As shown in FIGS. 7A to 7F, when comparing the real-time change in number density using the system for measuring condensable particulate matter according to an embodiment of the present invention and the conventional vehicle exhaust gas measurement device, it can be seen that the system of the present invention and the conventional vehicle exhaust gas measurement device show very similar results.

Specifically, in the measurement of high-concentration exhaust gas emitted from diesel grade 4 and grade 5 vehicles, it was confirmed that the system of the present invention could measure even more than the limit value that the conventional measurement device could measure. In addition, in the measurement of vehicles (LPG, CNG) using gas fuel, it was confirmed that unlike the conventional exhaust gas measurement device in which particles of small particle size are mostly lost, the system of the present invention directly sampled the exhaust gas of the vehicle, and could precisely measure the condensable particulate matter.

With reference to the above descriptions, those skilled in the art to which the present invention pertains will be able to understand that the present invention may be embodied in other specific forms without changing the technical spirit or essential characteristics thereof.

Therefore, it should be understood that the above-described embodiments are illustrative in all respects and are not intended to limit the present invention to the above-described embodiments, and the scope of the present invention is in the claims described later rather than the detailed description described above. All changes or modifications derived from the meaning and scope of the claims and equivalent concepts should be construed as being included in the scope of the present invention.

What is claimed is:

1. A method for measuring in real-time condensable particulate matter formed from exhaust gas of an internal combustion engine, comprising the steps of:
    sucking exhaust gas from the internal combustion engine;
    diluting the sucked exhaust gas to simulate it to atmospheric condition;
    a first measurement step of branching some of the exhaust gas of the atmospheric condition and measuring particulate matter including condensable particulate matter and filterable particulate matter;
    a second measurement step of branching the rest of the exhaust gas of the atmospheric condition to remove the condensable particulate matter and measuring the particulate matter including only the filterable particulate matter; and
    comparing the first measurement step and the second measurement step to calculate an amount of the condensable particulate matter in the exhaust gas of the atmospheric condition,
    wherein the step of diluting the sucked exhaust gas to simulate it to atmospheric condition is performed by injecting air into the exhaust gas in a dilution chamber and in a range of −10° C. to 50° C. through a cooler and a heater,
    wherein in the step of diluting the sucked exhaust gas to simulate it to atmospheric condition, a ratio of the air to a volume of the exhaust gas is made in a dilution ratio of 1:9 to 1:29,
    wherein some of the exhaust gas in the atmospheric condition is branched to a bypass pipe, and the first measurement step is performed and rest of the exhaust gas in the atmospheric condition is branched to a thermodenuder and the second measurement step is performed, and
    wherein the thermodenuder is heated in a range of 25° C. to 300° C. and the condensable particulate matter is removed by being adsorbed on a carbon cloth inside the thermodenuder.

2. The method according to claim 1, further comprising the step of filtering fine particulate matter from the exhaust gas, after the step of sucking exhaust gas from the internal combustion engine.

3. The method according to claim 2, wherein the step of filtering fine particulate matter is implemented using a cyclone.

4. The method according to claim 3, wherein the exhaust gas is transferred to the cyclone or the dilution chamber via a conduit, and the conduit maintains a temperature range of 200° C. to 300° C.

5. The method according to claim 4, wherein the conduit is wound with a heating tape so that it is able to be heated.

6. The method according to claim 1, wherein the step of calculating an amount of the condensable particulate matter comprises measuring number density size distribution of the particulate matter including the condensable particulate matter and the filterable particulate matter in the first measurement step, measuring the number density size distribution of the particulate matter including only the filterable particulate matter in the second measurement step, and subtracting the concentration particle size distribution of the second measurement step from the concentration particle size distribution of the first measurement step.

* * * * *